(12) United States Patent
Morimoto et al.

(10) Patent No.: US 6,998,647 B2
(45) Date of Patent: Feb. 14, 2006

(54) INFRARED COMMUNICATION MODULE WITH REMOTE CONTROL TRANSMISSION FUNCTION

(75) Inventors: Keiji Morimoto, Kashiba (JP); Hiroshi Mizuno, Tenri (JP)

(73) Assignee: Sharp Kabushiki Kaisha, Osaka (JP)

(*) Notice: Subject to any disclaimer, the term of this patent is extended or adjusted under 35 U.S.C. 154(b) by 350 days.

(21) Appl. No.: 10/359,630

(22) Filed: Feb. 7, 2003

(65) Prior Publication Data
US 2003/0156842 A1 Aug. 21, 2003

(30) Foreign Application Priority Data
Feb. 18, 2002 (JP) .............. 2002-039713

(51) Int. Cl.
*H01L 31/0203* (2006.01)
*H01L 33/00* (2006.01)
(52) U.S. Cl. .............. 257/99; 257/100; 257/433
(58) Field of Classification Search .......... 257/99, 257/100, 433, 434
See application file for complete search history.

(56) References Cited

U.S. PATENT DOCUMENTS

| | | | | |
|---|---|---|---|---|
| 5,668,383 A | * | 9/1997 | Krieger | 257/80 |
| 6,169,295 B1 | * | 1/2001 | Koo | 257/81 |
| 6,417,946 B1 | * | 7/2002 | Krieger | 398/139 |
| 6,583,444 B1 | * | 6/2003 | Fjelstad | 257/82 |
| 6,590,152 B1 | * | 7/2003 | Horio et al. | 174/35 GC |
| 6,762,472 B1 | * | 7/2004 | Loh et al. | 257/432 |

FOREIGN PATENT DOCUMENTS

| | | |
|---|---|---|
| JP | 8-314831 A | 11/1996 |
| JP | 2000-77775 A | 3/2000 |
| JP | 2001-244498 A | 9/2001 |
| JP | 2001244498 A * | 9/2001 |

* cited by examiner

*Primary Examiner*—John B. Vigushin
(74) *Attorney, Agent, or Firm*—Birch, Stewart, Kolasch & Birch, LLP

(57) ABSTRACT

An infrared communication module with remote control function includes a PD chip for IrDA data, an IC chip, an LED chip for IrDA data, and an LED chip for remote control transmission that are mounted on a PWB. The PD chip, IC chip and LED chips are sealed by a resin. The resin forms a light-receiving lens for infrared communication surrounding the PD chip, a light-emitting lens for infrared communication surrounding the LED chip for IrDA data, and a light-emitting lens for remote control surrounding the LED chip for remote control transmission. Such a structure allows an infrared communication module with remote control transmission function having a structure that can prevent increase in the cost of production and a mounting space.

5 Claims, 6 Drawing Sheets

- HALF-DUPLEX OPTICAL COMMUNICATION
- ONE-TO-ONE COMMUNICATION
- COMMUNICATION DISTANCE OF MIN.1M (IrDA 1.0)
- COMMUNICATION COVERAGE OF ±15°
- RETURN TO ZERO (RZI) MODULATION SYSTEM
- DATA RATE OF 2.4kbps-115.2kbps

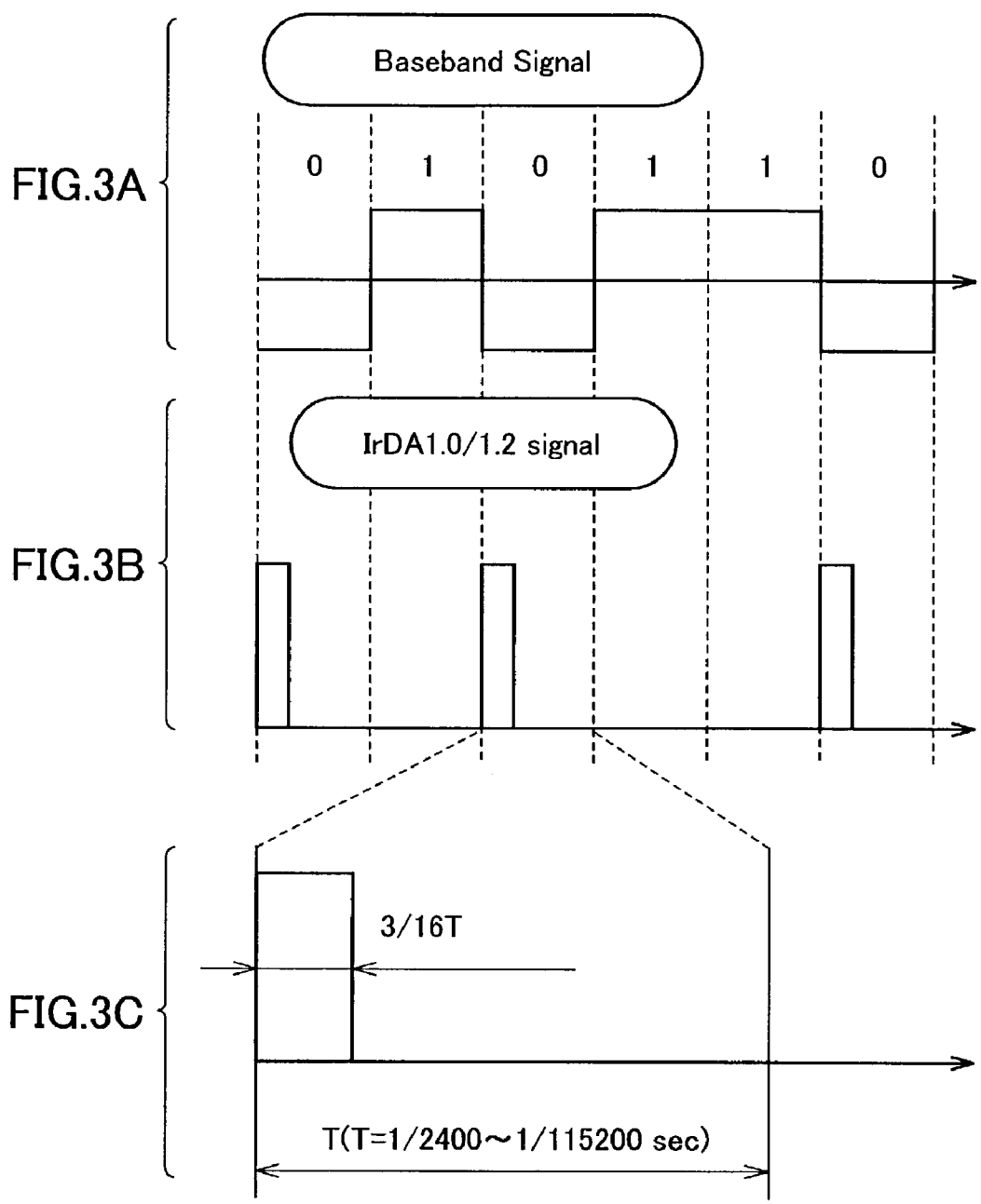

INFRARED COMMUNICATION MODULE WITH REMOTE CONTROL TRANSMISSION FUNCTION

BACKGROUND OF THE INVENTION

1. Field of the Invention

The present invention relates to a structure of an infrared communication module with a function of transmitting a signal by remote control (hereinafter also referred to as "remote control transmission function") capable of signal transmission by remote control and infrared communication.

2. Description of the Background Art

FIG. 8 shows the structure of a conventional infrared communication module 400 using IrDA (The Infrared Data Association) data. As shown in FIG. 8, a PD (Photo Diode) chip 401, an IC chip 403 and an LED chip 405 are mounted on a substrate 406 such as a PWB (Printed Wiring Board). PD chip 401, IC chip 403 and LED chip 405 are provided with a resin mold 407 forming a light-receiving lens 402 and a light-emitting lens 404. That is, a so-called double lens structure is employed.

When infrared communication is used, respective infrared communication modules in devices such as game, clock and portable telephone devices and other personal digital assistants (PDA) are arranged to face each other for communication. In a remote control transmitter added to a TV, a VTR or other audio devices, a remote control transmission portion is arranged to face a transmission portion of a main unit for communication therebetween. Thus, the infrared communication module and the remote control transmission portion have different structures, and are mounted in respective devices for use.

As such, conventionally, the infrared communication module has a structure different from that of the remote control transmission portion. Accordingly, it is conceivable that, if the function of the infrared communication module and that of the remote control transmission portion are integrated together in a PDA or an audio device, infrared communication and remote control transmission can be achieved by one transmission device, not requiring two devices of a remote control transmission device and a personal digital assistant device, improving convenience.

It is understood, however, that two modules are still required even if the infrared communication module for IrDA data communication and the remote control transmission portion for remote control transmission are mounted in one device. The two modules simply mounted on a substrate would require a mounting space therefor, hindering size reduction of the device. In addition, the cost of production would disadvantageously be increased compared to the conventional case where the two modules are separately manufactured.

SUMMARY OF THE INVENTION

The present invention was made to solve the problems described above, and is directed to provide an infrared communication module with remote control transmission function having a structure that can prevent increase in a mounting space and the cost of production.

According to the present invention, an infrared communication module with remote control transmission function includes a substrate, a light-receiving element for infrared communication mounted on the substrate, a light-emitting element for infrared communication mounted on the substrate, a light-emitting element for remote control signal transmission mounted on the substrate, and a seal resin covering the substrate, forming a light-receiving lens for infrared communication while covering the light-receiving element for infrared communication, forming a light-emitting lens for infrared communication while covering the light-emitting element for infrared communication, and forming a light-emitting lens for remote control signal transmission while covering the light-emitting element for remote control signal transmission.

In the infrared communication module with remote control transmission function, a triple lens structure is realized including a light-receiving lens for infrared communication, a light-emitting lens for infrared communication and a light-emitting lens for remote control signal transmission. This allows both infrared communication and remote control transmission in, for example, a PDA or an audio device. Moreover, communication can be achieved by one device, not requiring two devices of a remote control transmission device and a personal digital assistant device, allowing reduction in size of the device and improvement in convenience.

Preferably, the substrate is a printed wiring board. This allows leadless surface mounting of each element and reduction in the thickness of a seal resin forming each lens, allowing a smaller size of the infrared communication module with remote control transmission function. Moreover, a light-receiving element or a light-emitting element can be mounted with its optical axis arranged in the vertical or horizontal direction.

More preferably, the infrared communication module with remote control transmission function further includes a signal switch means for switching between an infrared communication signal and a remote control transmission signal. Accordingly, mutual effects of the infrared communication signal and the remote control transmission signal can be avoided, improving communication stability and reliability.

More preferably, the infrared communication uses IrDA data communication. This allows cordless communication between, for example, a personal computer and a personal digital assistant device. Other applications are also possible including image communication between a digital still camera and a printer without an intermediary personal computer and cordless communication between devices each provided with a USB (Universal Serial Bus).

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A, 3B and 3C show the second view for illustrating the IrDA data transmission signal;

DESCRIPTION OF THE PREFERRED EMBODIMENTS

Figure 1:
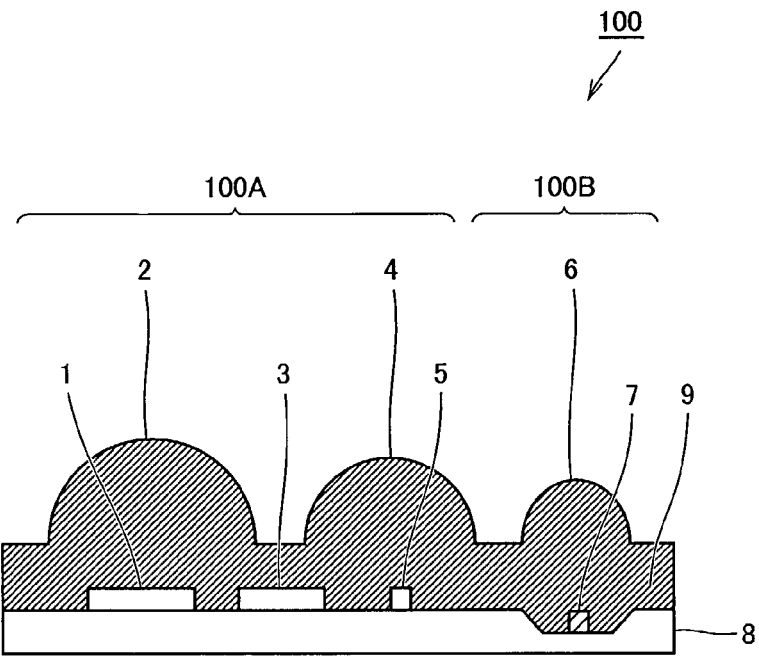
FIG. 1 represents a section structure of an infrared communication module with remote control transmission function according to an embodiment of the present invention.
Figure 2:
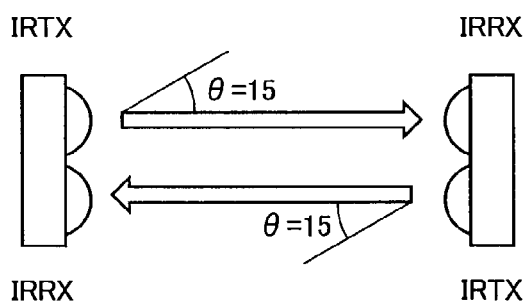
FIG. 2 is the first view for illustrating an IrDA data transmission signal.

Embodiments based on the present invention will be described with reference to the drawings. First, the section structure of an infrared communication module 100 with remote control transmission function according to an embodiment of the present invention is shown in FIG. 1.

In infrared communication module 100 with remote control transmission function according to the present embodiment, a PD chip 1 serving as a light-receiving element for infrared communication for IrDA data, an IC chip 3, an LED chip 5 serving as a light-emitting element for infrared communication for IrDA data, and an LED chip 7 serving as a light-emitting element for transmitting a signal by remote control are mounted at predetermined positions on a substrate 8 such as a PWB. PD chip 1, IC chip 3 and LED chips 5 and 7 are covered by a seal resin 9.

Seal resin 9 forms a dome-shaped light-receiving lens for infrared communication 2 surrounding PD chip 1 for IrDA data, a dome-shaped light-emitting lens for infrared communication 4 surrounding LED chip 5 for IrDA data, and a dome-shaped light-emitting lens for remote control 6 surrounding LED chip 7 for remote control transmission. Light-receiving lens for infrared communication 2, light-emitting lens for infrared communication 4 and light-emitting lens for remote control 6 constitute a triple lens structure on one substrate.

In the structure above, PD chip 1, infrared communication light-receiving lens 2, IC chip 3, infrared communication light-emitting lens 4 and LED chip 5 constitute an infrared communication module 110A. Remote control light-emitting lens 6 and LED chip 7 constitute remote control transmission portion (remote control LED) 100B.

Such a triple lens structure allows infrared communication using IrDA data as well as signal transmission by remote control in a PDA or an audio device. This also allows one device to be used for communication, eliminating the need for provision of two devices of a remote control transmission device and a personal digital assistant device, improving convenience.

In a portable telephone device, as shown in FIGS. 2, 3A, 3B and 3C, a signal in infrared communication using IrDA data is transmitted by a baseband system requiring a communication distance of 20 cm, a maximum transmission speed of 115.2 bps, a directivity of ±15° on both the light-emitting and light-receiving sides, and a light-emission intensity of MIN 3.6 mW/sr in the case of IrDA Ver. 1.2 (Low Power). A modulated electric signal is transmitted by an optical signal and is demodulated in response to reception of the optical signal. The optical wavelength is in the range between 850 nm and 900 nm (according to the IrDA standard).

Figure 4A:
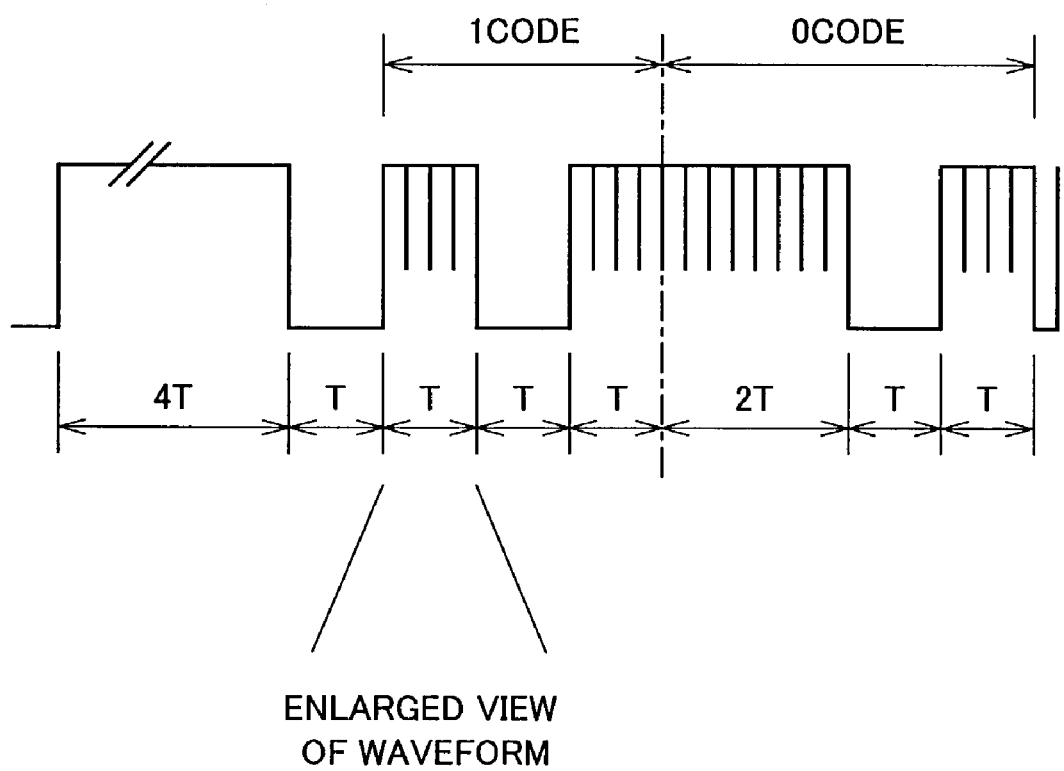
FIGS. 4A and 4B illustrate a remote control transmission signal.
Figure 4B:
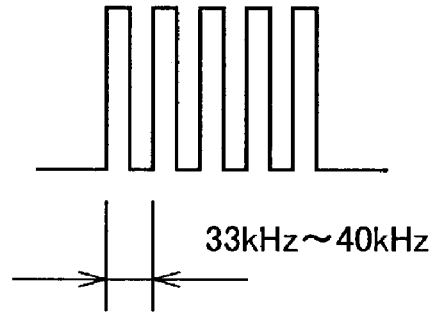

As shown in FIGS. 4A and 4B, a signal in remote control transmission is transmitted by an ASK system with a communication distance of approximately 8 m, a transmission waveform having a sub carrier wave with a central frequency of 33 kHz to 40 kHz, a directivity of approximately 15° to 20° at a half angle (the light emission intensity being 50% of a peak value), and a light emission intensity of approximately 40 mW/sr. The optical wavelength is in the range between approximately 900 and 1000 nm (no standard).

As such, the IrDA data transmission signal is totally different from the remote control transmission signal in terms of the light-emitting portions, directivity, light emission intensity, wavelength and the like, so that they cannot be used together on the same chip. Accordingly, the need arises for a triple lens structure constituted by light-receiving lens for infrared communication 2, light-emitting lens for infrared communication 4 and light-emitting lens for remote control 6, as described above.

Figure 5A:
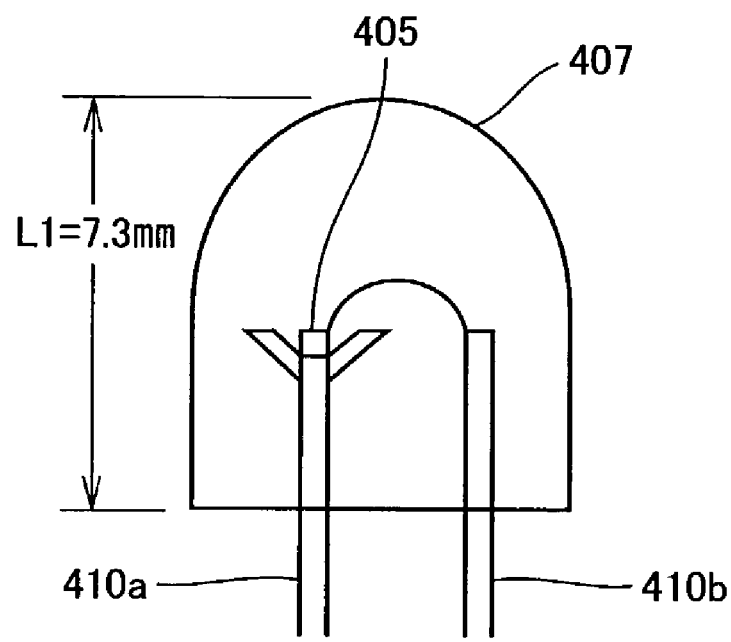
FIG. 5A represents a section structure of an LED for remote control (hereinafter referred to as "remote control LED") according to the conventional technique.
Figure 5B:
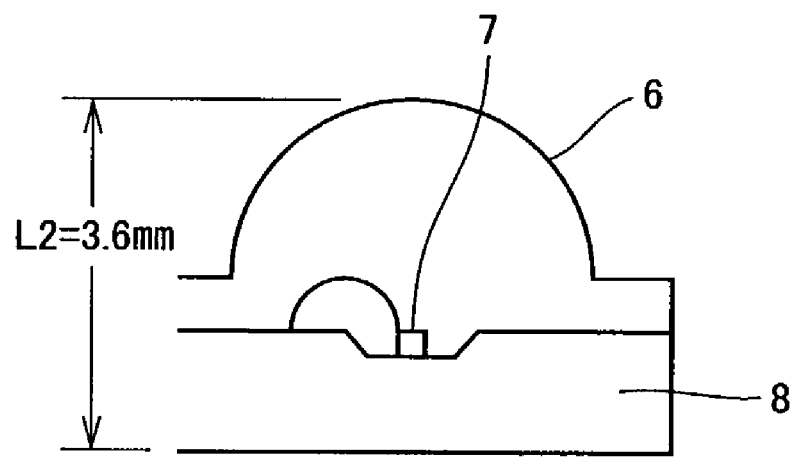
FIG. 5B represents a section structure of a remote control LED according to the present embodiment.

FIG. 5A illustrates the structure of a remote control LED in the conventional technique, whereas FIG. 5B illustrates the structure of a remote control LED 100B in the present embodiment. As shown in FIG. 5A, in the structure of the conventional remote control LED, a bullet-shaped resin 407 is formed on lead terminals 410a and 410b. Thus, sealing by resin must also be provided for lead 410a on which LED chip 405 is mounted in order to ensure its strength, resulting in a relatively increased entire length of resin 407 (e.g. L=7.3 mm).

By contrast, remote control LED 100B according to the present embodiment employs, as shown in FIG. 5B, a structure in which LED chip 7 is directly mounted on substrate 8 and sealed by resin, allowing a decreased thickness (L2) compared to that of the conventional remote control LED (e.g. L2=3.6 mm).

Figure 6A:
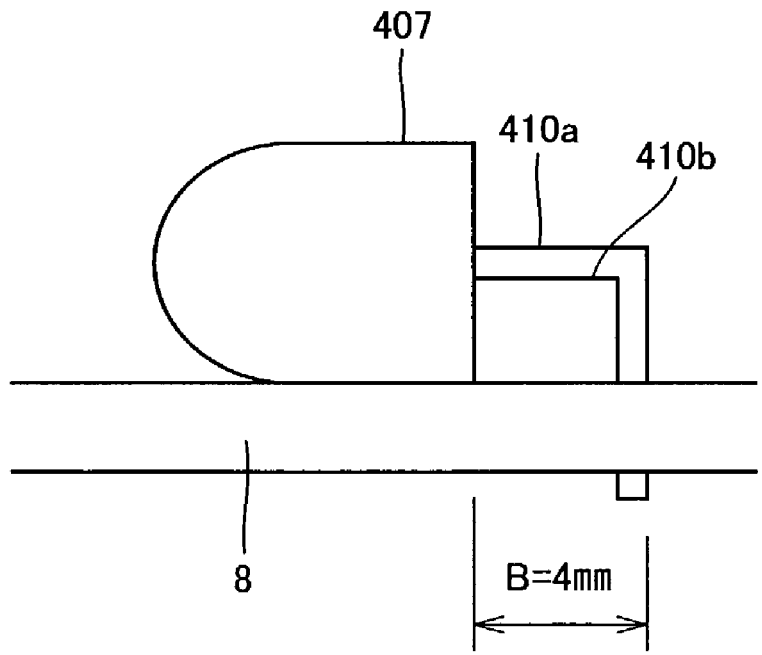
FIG. 6A shows a state where the remote control LED having the conventional structure is mounted on an external substrate.

Moreover, when the remote control LED having the conventional structure is mounted on external substrate 80, leads 410a, 410b of the remote control LED are bent for mounting as shown in FIG. 6A, requiring an extra space for the bent portions of leads 410a, 410b (B in FIG. 6A; B=e.g. 4 mm).

Figure 6B:
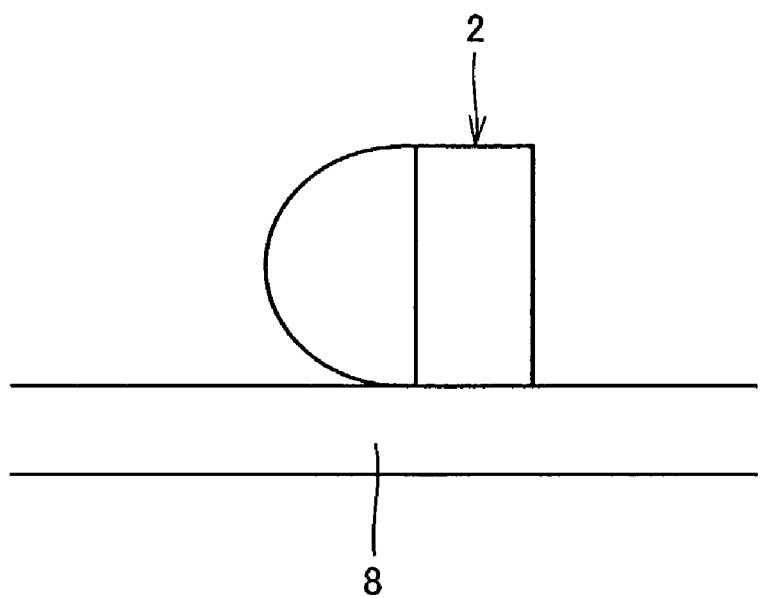
FIG. 6B shows a state where the remote control LED employed in the present embodiment is mounted on the external substrate.

According to infrared communication module 100 with remote control transmission function in the present embodiment, on the other hand, no lead is provided for the remote control LED as shown in FIG. 6B, so that a surface mount reflow structure allowing leadless direct connection of substrate 8 to external substrate 80 can be employed, eliminating the need for providing a mounting space for bent portions of leads as in the conventional structure. In addition, according to infrared communication module 100 with remote control transmission function in the present embodiment, an optical axis on a mounting board may be provided not only in a vertical direction but also in a horizontal direction, as shown in FIG. 6B.

Figure 7:
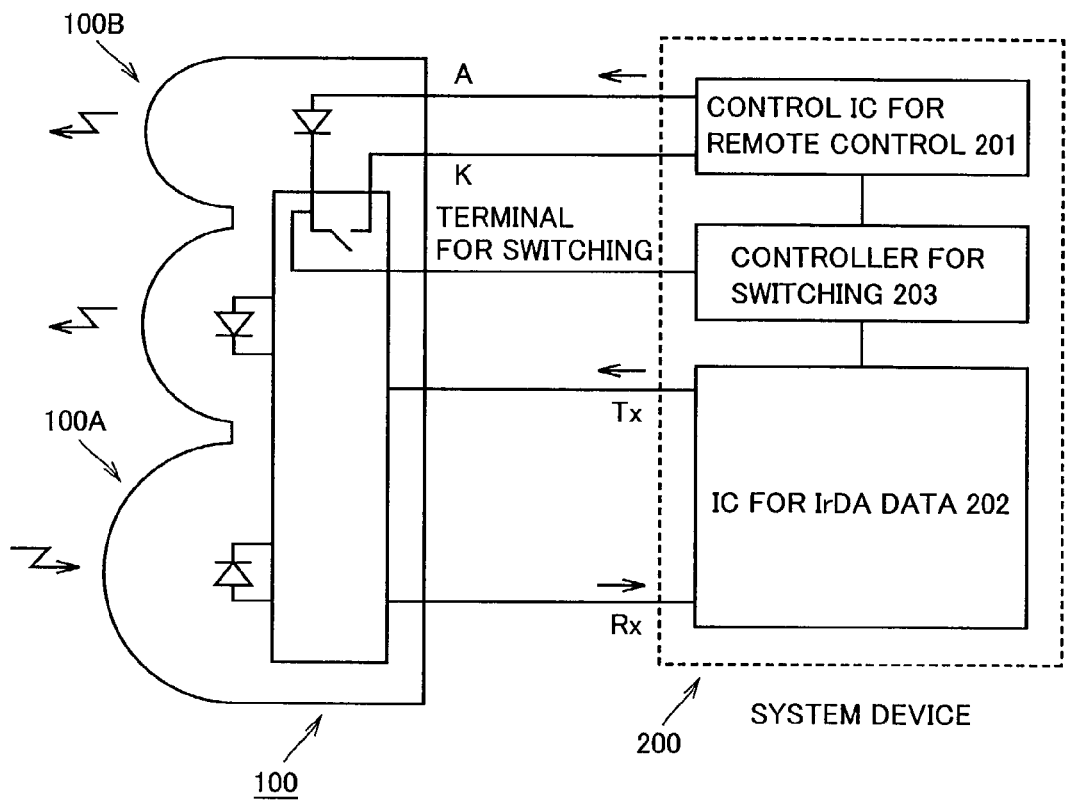
FIG. 7 is a block diagram showing the structure of a switch control portion.
Figure 8:
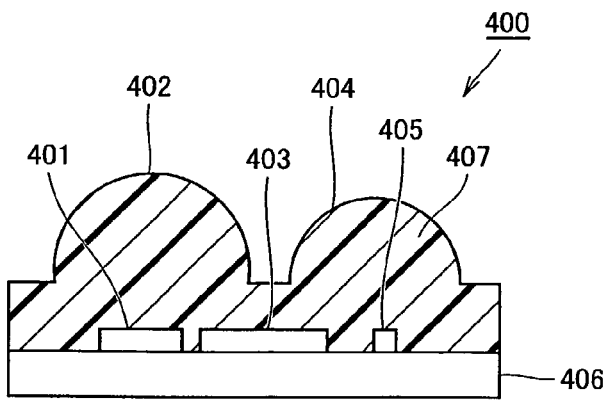
FIG. 8 represents a section structure of an infrared communication module according to the conventional technique.

As has been described with reference to FIGS. 2 to 4B, when IrDA transmission signal and a remote control transmission signal are transmitted at the same time, the light-receiving portion for infrared communication may show a response due to an effect of a remote control transmission signal, even if the signals are different from each other. In another preferable embodiment, as shown in FIG. 7, a switch controller 203 is provided in a system device 200 as a signal switch means for switching between a control IC for remote control 201 and an IC for IrDA data 202. In addition, a switch terminal 300 is provided in infrared communication module 100 with remote control transmission function as a signal switch means for connection to switch controller 203 so as to allow a signal for switching to be output from the system device 200 side. Thus, switching between the IrDA data transmission signal and the remote control transmission signal is performed.

Function and Effect

According to infrared communication module 100 with remote control transmission function in the embodiments above, infrared communication module 100A and remote control transmission portion (remote control LED) 100B are integrated into one module in order to reduce a mounting space on a substrate in a device. Moreover, in application to a device such as a personal digital assistant (PDA), remote control data and IrDA data can be used together, allowing an extended range of use application to devices such as a TV, a VTR and other audio devices.

According to the infrared communication module with remote control transmission function based on the present invention, a triple lens structure is realized including a light-receiving lens for infrared communication, a light-emitting lens for infrared communication and a light-emitting lens for remote control signal transmission on one substrate, allowing infrared communication as well as remote control transmission in, for example, a PDA or an audio device. In addition, one device may be used for communication, not requiring two devices of a remote control transmission device and a personal digital assistant device, allowing reduction in size of the device and improvement in convenience.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An infrared communication module with remote control transmission function capable of signal transmission by remote control and infrared communication, comprising:
   a substrate;
   a light-receiving element for infrared communication mounted on said substrate;
   a light-emitting element for infrared communication mounted on said substrate;
   a light-emitting element for remote control signal transmission mounted on said substrate; and
   a seal resin covering said substrate, forming a light-receiving lens for infrared communication while covering said light-receiving element for infrared communication, forming a light-emitting lens for infrared communication while covering said light-emitting element for infrared communication, and forming a light-emitting lens for remote control signal transmission while covering said light-emitting element for remote control signal transmission.

2. The infrared communication module with remote control transmission function according to claim 1, wherein said substrate is a printed wiring board.

3. The infrared communication module with remote control transmission function according to claim 1, further comprising a signal switch means for switching between an infrared communication signal of said respective light-receiving element and a remote control transmission signal of said respective light emitting clement.

4. The infrared communication module with remote control transmission function according to claim 1, wherein IrDA data communication is used for said infrared communication.

5. The infrared communication module with remote control transmission function according to claim 1, wherein said light-emitting element for remote control signal transmission is mounted as a leadless direct connection on said substrate facing the direction parallel to the surface of the substrate.

* * * * *